United States Patent
Wong et al.

(10) Patent No.: US 9,862,083 B2
(45) Date of Patent: Jan. 9, 2018

(54) VACUUM PISTON RETENTION FOR A COMBUSTION DRIVEN FASTENER HAND TOOL

(71) Applicant: Power Tech Staple and Nail, Inc., Monterey Park, CA (US)

(72) Inventors: Raymond Wong, Alhambra, CA (US); Shih-Yi Chen, Taoyuan (TW); Chin-Chuan Chen, Taoyuan (TW)

(73) Assignee: Power Tech Staple and Nail, Inc., Monterey Park, CA (US)

( * ) Notice: Subject to any disclaimer, the term of this patent is extended or adjusted under 35 U.S.C. 154(b) by 487 days.

(21) Appl. No.: 14/505,242

(22) Filed: Oct. 2, 2014

(65) Prior Publication Data

US 2016/0059398 A1 Mar. 3, 2016

Related U.S. Application Data

(60) Provisional application No. 62/043,279, filed on Aug. 28, 2014.

(51) Int. Cl.
*B25C 1/08* (2006.01)

(52) U.S. Cl.
CPC ..................... *B25C 1/08* (2013.01)

(58) Field of Classification Search
CPC ........... B25C 1/008; F02B 19/00; F02B 63/02
USPC .................................... 227/9, 10; 123/46 SC
See application file for complete search history.

(56) References Cited

U.S. PATENT DOCUMENTS

| | | | |
|---|---|---|---|
| 4,483,474 A * | 11/1984 | Nikolich | B25C 1/008 123/46 SC |
| 4,665,868 A * | 5/1987 | Adams | F02B 71/04 123/292 |
| 4,739,915 A * | 4/1988 | Cotta | B25C 1/08 123/46 SC |
| 4,905,634 A | 3/1990 | Veldman | |
| 5,860,580 A | 1/1999 | Velan et al. | |
| 6,378,752 B1 | 4/2002 | Gaudron | |
| 6,634,325 B1 * | 10/2003 | Adams | F02B 71/04 123/46 R |
| 6,679,411 B2 | 1/2004 | Popovich et al. | |
| 6,840,033 B2 * | 1/2005 | Adams | B25C 1/08 123/281 |
| 7,770,504 B2 * | 8/2010 | Tippmann, Sr. | F41A 1/04 124/56 |

(Continued)

*Primary Examiner* — Nathaniel Chukwurah
(74) *Attorney, Agent, or Firm* — Canady & Lortz LLP; Bradley K. Lortz (57) ABSTRACT

A combustion driven fastener hand tool is disclosed having a piston driven by combustion within a chamber, the piston affixed to a driver for forcing a fastener. The piston forms a retention chamber having a lower internal pressure ("vacuum") than that of the surrounding combustion chamber when the piston is disposed in the starting position for operation of the device. The lower internal pressure of the retention chamber (generated from a previous combustion cycle) momentarily holds the piston in place such that combustion behind the piston must first increase sufficiently to overcome holding force of the retention chamber before the piston moves. Requiring build up of combustion chamber pressure before piston motion greatly improves efficiency and power of the device. Use of the vacuum retention chamber is readily tunable with proper sizing of the chamber.

20 Claims, 8 Drawing Sheets

(56) References Cited

U.S. PATENT DOCUMENTS

2008/0217372 A1\* 9/2008 Webb ..................... B25C 1/008
  227/10
2012/0210974 A1   8/2012 Adams \* cited by examiner

VACUUM PISTON RETENTION FOR A COMBUSTION DRIVEN FASTENER HAND TOOL

CROSS-REFERENCE TO RELATED APPLICATIONS

This application claims the benefit under 35 U.S.C. §119 (e) of the following U.S. provisional patent application, which is incorporated by reference herein:

U.S. Provisional Patent Application No. 62/043,279, filed Aug. 28, 2014, and entitled "COMBUSTION DRIVEN FASTENER HAND TOOL," by Wong et al.

BACKGROUND OF THE INVENTION

1. Field of the Invention

This invention relates to powered fastener driving hand tools. Particularly, this invention relates to a combustion driven fastener hand tool.

2. Description of the Related Art

Powered fastener driving tools, e.g. nail guns, have existed for decades. Perhaps not coincidentally, the first commercial nail gun was introduced in 1950 after World War II wherein the technology for rapidly firing projectiles was greatly advanced. The first nail guns were pneumatic, driven by compressed air. Although pneumatic power is still the most prevalent, over time fastener driving tools have been developed using other means of power, such as electric motors, solonoids, combustibles, e.g gas or explosive powder, have also been developed. Some development of technology related to powered fastener drivers, and particularly combustion driven fastener tools has occurred. However, there is still much need for further development.

Combustion driven fastener hand tools employing combustibles, e.g. gas or powder, to force a piston driver against a fastener introduce a unique set of parameters which must be properly balanced in order to achieve a working device. Sizing of the combustion chamber and valving are critical, in addition to the fuel delivery and mixing components. Moreover, greater optimization of a given design to improve power and efficiency can be greatly affected through precise understanding of the combustion process. For example, it has been determined that using a combustion chamber divided into portions having a control plate therebetween can greatly improve the efficiency and power of a combustion driven fastener device. In addition, it has also been previously observed that accurate location of the starting position of the driving piston can be important in the operation of a combustion driven device, particularly if the piston is heavy and likely to move under its own weight.

U.S Patent Application Publication No. 2012/0210974, published Aug. 23, 2012, by Adams, discloses a gas-powered tool motor includes a combustion chamber with an intake valve at one end, an exhaust valve at another end, and a control plate or control valve between two portions of the combustion chamber. A piston or other positive displacement device is in communication with the combustion chamber. The intake and exhaust valves have closure members that are movable along a common axis in tandem between collective open positions for recharging the combustion chamber with the fuel and air mixture and collective closed positions for detonating the fuel and air mixture in the combustion chamber and displacing the positive displacement device. The control plate or control valve supports limited air flows from a first portion of the combustion chamber to a second portion of the combustion chamber even in the closed position of the control valve for supporting two-stage combustion.

U.S. Pat. No. 5,860,580, issued Jan. 19, 1999, by Velan et al., discloses an improved combustion powered tool for driving fasteners into a workpiece includes a main housing enclosing a cylinder body and an adjacent combustion chamber. The tool includes a workpiece-contacting nosepiece attached to the housing at the end opposite the combustion chamber and holds fasteners to be driven into the workpiece. A reciprocally disposed piston is mounted within the cylinder body, and is attached to an elongate driver blade, the driver blade being used to impact the fasteners and drive them into the workpiece. At the upper end of the cylinder body is disposed a compressible piston retaining device. The retaining device is of sufficient strength to accommodate the weight of the piston and to retard the upward velocity of a returning piston, but is overcome when the tool is fired.

However, there is still a need in the art for apparatuses and methods improving the operation of combustion driven fastener hand tools. There is also a need for such apparatuses and methods that operate reliably and efficiently over many uses and at a reduced cost. In addition, there is a need for such apparatuses and methods to allow comfortable and precise control of combustion driven fastener hand tools. There is further a need for such systems and apparatuses to be inexpensively manufacturable and readily serviceable. These and other needs are met by the present invention as detailed hereafter.

SUMMARY OF THE INVENTION

A combustion driven fastener hand tool is disclosed having a piston driven by combustion within a chamber, the piston affixed to a driver for forcing a fastener. The piston forms a retention chamber having a lower internal pressure ("vacuum") than that of the surrounding combustion chamber when the piston is disposed in the starting position for operation of the device. The lower internal pressure of the retention chamber (generated from a previous combustion cycle) momentarily holds the piston in place such that combustion behind the piston must first increase sufficiently to overcome holding force of the retention chamber before the piston moves. Requiring build up of combustion chamber pressure before piston motion greatly improves efficiency and power of the device. In addition, use of the vacuum retention chamber is readily tunable with proper sizing of the chamber and eliminates wearable parts, which would exist with a mechanical retention device.

A typical embodiment of the invention comprises a combustion driven fastener apparatus having a piston disposed in a combustion chamber, the piston movable from a starting position to an end position within the combustion chamber, a driver affixed to the piston for driving a fastener as the piston moves from the starting position to the end position, and a retention chamber closed within the combustion chamber with the piston in the starting position and opened after the piston is moved from the starting position, the retention chamber having at least a first interior wall affixed to the piston and at least a second interior wall affixed to the combustion chamber. In some embodiments, the retention chamber can comprise a relief valve for gas to escape the retention chamber as the retention chamber is closed as the piston returns to the starting position.

The retention chamber can seal a pressure differential between the retention chamber and the combustion chamber after the retention chamber is closed in response to a previous firing of the combustion driven fastener apparatus. The pressure differential can momentarily resist motion of the piston under combustion from firing the combustion driven fastener apparatus. Typically, the pressure differential comprises a lower pressure in the retention chamber than the combustion chamber. A dynamic seal can be used to seal the retention chamber by moving into an interface between a first portion of the retention chamber affixed to the piston and a second portion of the retention chamber affixed to the combustion chamber.

Further, the retention chamber can comprise a first cylindrical portion affixed to the piston and a second cylindrical portion affixed to the combustion chamber. One of the first cylindrical portion and the second cylindrical portion can fit inside the other to form the retention chamber. In addition, a seal can be disposed in a groove of one of the first cylindrical portion and the second cylindrical portion to seal a lower pressure within the retention chamber than the combustion chamber.

In further embodiments, at least one of the first cylindrical portion and the second cylindrical portion can comprise an open cylinder. In this case, one of the first cylindrical portion and the second cylindrical portion can comprise the open cylinder and a remaining one of the first cylindrical portion and the second cylindrical portion can comprise a closed cylinder. Alternately, one of the first cylindrical portion and the second cylindrical portion can comprise the open cylinder and a remaining one of the first cylindrical portion and the second cylindrical portion can comprise a smaller open cylinder that fits inside the open cylinder to form the retention chamber.

In other embodiments, the device can include a seal for the retention chamber for allowing gas to escape the retention chamber as the retention chamber is closed as the piston returns to the starting position. For example, one of the first interior wall and the second interior wall can comprise a suction cup and a remaining one of the first interior wall and the second interior wall can comprise a flat surface such that the seal for the retention chamber comprises the suction cup. Similarly, one of the first interior wall and the second interior wall can comprise a face seal disposed in a surface and a remaining one of the first interior wall and the second interior wall can comprise a flat surface such that the seal for the retention chamber comprises the face seal.

In a similar manner, an embodiment of the invention can comprise a combustion driven fastener apparatus, including a piston means for moving from a starting position to an end position within the combustion chamber disposed in a combustion chamber, a driver means for driving a fastener as the piston moves from the starting position to the end position, the driver means affixed to the piston means, and a retention chamber means for sealing a pressure differential between the retention chamber and the combustion chamber after the retention chamber is closed in response to a previous firing of the combustion driven fastener apparatus. The retention chamber means is closed within the combustion chamber with the piston in the starting position and opened after the piston is moved from the starting position. This apparatus embodiment can be further modified consistent with any of the apparatuses and/or methods described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

As previously mentioned, a combustion driven fastener hand tool is disclosed having a piston driven by combustion within a chamber, the piston affixed to a driver for forcing a fastener. The piston forms a retention chamber having a lower internal pressure ("vacuum") than that of the surrounding combustion chamber when the piston is disposed in the starting position for operation of the device. When the retention chamber is formed, by definition it is closed to prevent gas pressure from entering (i.e. sealed). The lower internal pressure of the retention chamber (generated from a previous combustion cycle) holds the piston in place such that combustion behind the piston must first increase sufficiently to overcome holding force of the retention chamber before the piston moves. Requiring build up of combustion chamber pressure before piston motion greatly improves efficiency and power of the device. In addition, use of the vacuum retention chamber is readily tunable with proper sizing of the chamber and eliminates wearable parts, which would exist with a mechanical retention device.

It should be noted that throughout the present application the term "vacuum" is used to refer to the pressure within chambers of a combustion driven fastener hand tool. Particularly, "vacuum" in this context indicates that the gas pressure within the specified chamber is lower than ambient and/or lower than that of surrounding or adjacent spaces and not necessarily any actual or approximate absence of gas pressure. "Vacuum" as used herein identifies a lower relative pressure as will be understood by those skilled in the art.

It should also be noted that although example embodiments of the invention are shown herein applied to a combustion driven fastener hand tool which operates using a combustion chamber divided in portions separated by a control plate and charged with a gas and air mixture, e.g. as described in U.S Patent Application Publication No. 2012/0210974, published Aug. 23, 2012, by Adams, which is incorporated by reference herein, embodiments of the invention are not limited to this type of combustion chamber or fuel. Instead, embodiments of the invention may be employed with any known combustion driven fastener hand tool where the combustion cycle concludes yielding a temporary low pressure condition (i.e. "vacuum") within the piston chamber. Thus, conventional undivided combustion chambers and any other known combustion chamber type and/or liquid, gas, powder or any other known fuels can be used with embodiments of the invention as will be understood by those skilled in the art.

2. Combustion Cycle and Power Optimization

The typical combustion cycle within the piston cylinder of a combustion driven fastener hand tool begins with a piston and driver in a start position of the piston cylinder having a vacant portion of the piston cylinder behind it, the combustion chamber. A fuel charge is introduced into the combustion chamber. In some applications charging the chamber with fuel may also involve supplemental fuel preparation process(es), e.g. mixing of air within the combustion chamber. Alternately, in other applications the fuel and air mixture can enter the combustion chamber premixed. Following fuel charging, the fuel charge is ignited, e.g. using a spark generator. Combustion of the fuel charge results in extremely rapid pressure generation within the combustion chamber as the flame front moves from the point of ignition outward through the combustion chamber. The rising pressure forces the piston and it begins to move rapidly.

The nose piece of the tool supports a string of adjacent fasteners (e.g. bound together side by side by an breakable adhesive) with one fastener at the end of the string aligned with a driver (or "blade") affixed to the piston. The rapidly moving piston driver impacts the end fastener causing it to separate from the string and be driven in to the work piece below the nose piece. Excess energy of the rapidly moving piston is absorbed by a bumper at the end of the piston cylinder, the piston end position. In addition, as the piston reaches the end of the cylinder, the piston passes exhaust valves (e.g. reed valves) in the cylinder wall and the high pressure combustion gases within the combustion chamber is released through these exhaust valves which only allow combustion gases to exit without any air reentering. The rapid expulsion of the high pressure combustion gases through these exhaust valves leaves the combustion chamber with pressure below that of the ambient atmosphere, i.e. a "vacuum." Accordingly, the higher ambient pressure acting on the outer (lower) side of the piston now pushes the piston back up to return it to the starting position within the piston cylinder. Understanding the nuances of the combustion cycle can lead to improvements in optimizing the power delivered to a fastener by a combustion driven fastener hand tool as described hereafter.

As mentioned above, it has been previously noted that controlling the starting position of the piston is critical in order to maintain power delivered to the fastener. See U.S. Pat. No. 5,860,580, issued Jan. 19, 1999, by Velan et al. (hereafter "Velan"), which is incorporated by reference herein. Velan identifies the importance of reliably maintaining the starting position of the piston in the cylinder. If the piston slips out of position, e.g. as might occur when a heavier piston is employed, Velan suggests this increases the starting volume of the combustion chamber and lowers the compression of the incoming fuel resulting in inefficient combustion when the tool is fired. Accordingly, less power is imparted to the piston and driver blade and ultimately less power is delivered to drive the fastener into the workpiece. Velan also notes that increasing the overall piston cylinder length (while yielding an increase in the driving velocity of the piston) increases the return velocity of the piston. An increased return velocity of the piston can cause the piston to bounce off the top of the combustion chamber and similarly increase the starting volume of the combustion chamber. Accordingly, Velan proposes a radially expansible/contractible member disposed within an annular groove in the sidewall of the piston cylinder which cooperates with a detent in the piston to retain the piston at a pre-firing position.

The mechanical retention device taught by Velan, however, is wearable; over multiple firings rubbing contact between the expansible/contractible member and the detent of the piston will distort the member and/or the piston and require replacement. In addition, Velan only considers the effect of the starting piston position on the delivered power to the fastener without consideration of the force of retention on power derived from the combustion. Velan does not consider the use or effect of retention force on the combustion efficiency and power output. Velan appears to consider any such retention force to be a negligible consideration in affecting the combustion power delivery to the piston and fastener. Accordingly, Velan only requires that a retention force is sufficient to prevent any unwanted movement of the piston prior to firing.

3. Vacuum Piston Retention Chamber

Embodiments of the present invention employ a novel piston retention mechanism which exhibits very limited wear and can readily adapted and tuned for almost any known combustion driven fastener hand tool. Embodiments of the invention utilize the vacuum in the combustion chamber generated at the end of the piston travel after the combustion gases are ejected through exhaust valves. As described above, the vacuum in the combustion chamber causes the piston to return to the start position due to the external ambient air pressure. Embodiments of the invention capture some of the low pressure gas ("vacuum") in a small chamber which is formed by a portion of the piston in the start position within the interior space of the combustion chamber. The low pressure within this retention chamber operates to resist movement of the piston as the chamber is charged with fuel for the next firing. Thus, rather than a mechanical retention means as used by Velan, embodiments of the present invention employ a pressure differential to secure the piston in the starting position in preparation for the next firing. In the present application, this small chamber formed within the combustion chamber may be referenced as the "retention chamber" because it is used to retain the piston in position as combustion pressure develops behind the piston.

In addition, embodiments of the invention can further improve overall operation of the combustion driven fastener hand tool. Whereas Velan teaches it is only necessary to keep the piston from bouncing or slipping out of the start position, embodiments of the present invention can be readily implemented to also control the resistive retention force against combustion in order to improve the power derived from the combustion in driving the fastener. It is believed that if the piston is momentarily held from initially moving to allow the combustion pressure time to build up significantly before suddenly being released, more power is derived from the combustion and directed to the fastener. Even a relatively high resistive force, if it exists over only a very short displacement, will cost little in terms of the overall energy of combustion. On the other hand, by preventing piston motion until high pressure is first developed behind it, more of the combustion energy is converted in to piston motion than if the piston was allowed to begin moving at much lower pressure. It is important to appreciate that this momentary retention of the piston is not apparent to the user as the entire combustion cycle is so rapid in any case.

Figure 1A:
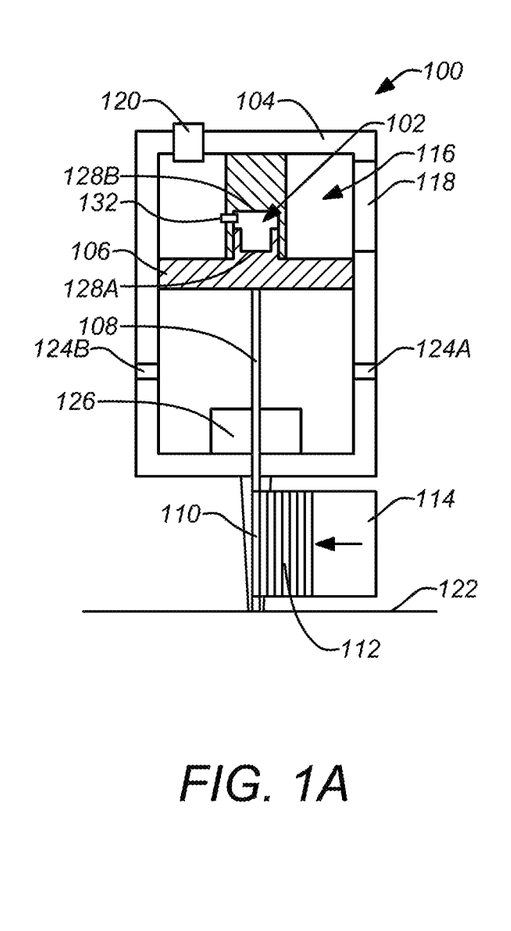
FIGS. 1A and 1B are schematic cross sectional drawings of a combustion chamber for a combustion driven fastener hand tool using a vacuum piston retention chamber in the piston start position and end position, respectively.
Figure 1B:
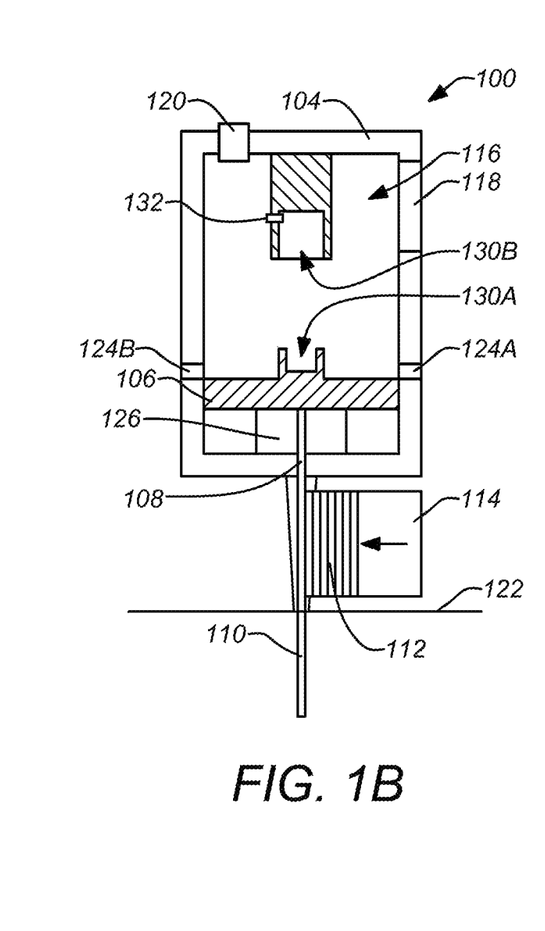

FIGS. 1A and 1B are schematic cross sectional drawings of a combustion chamber for a combustion driven fastener hand tool 100 using a vacuum piston retention chamber 102 in the piston start position and end position, respectively. The hand tool includes a piston cylinder 104 in which a piston 106 moves from a starting position (shown in FIG. 1A) at one end to an end position (shown in FIG. 1B) at the opposing end. A driver 108 is affixed to one side of the piston 106, which is aligned through an opening in the opposing end of the cylinder 104 with a fastener 110 disposed outside the piston cylinder 104. The fastener 110 is part of a fastener string 112 (e.g. bound together side by side by an breakable adhesive as previously described and well known in the art). The fastener string 112 is supported in a carrier 114 which applies a constant force in the arrow direction shown against the string to maintain the next fastener 110 in the string 112 in proper alignment to be driven.

As described in the previous section, the combustion chamber 116 first receives fuel through a port 118. The fuel may be pre-mixed or mixed within the chamber 116. Fuel delivery to the chamber is typically performed at or near ambient pressure. Following this the fuel in the combustion chamber 116 is ignited, e.g. typically by a spark generator of some type (not shown). The burning fuel generates a rapid rise in pressure within the combustion chamber 116. In some applications, the combustion chamber 116 can include a valve 120 (which can be adjustable by the user) to the ambient air to limit the maximum pressure during combustion in order to regulate the delivered power. (Raising the pressure limit of the valve raises the delivered power.) This pressure limit valve 120 remains closed except when the combustion pressure exceeds the pressure limit (which is much greater than ambient air pressure).

Combustion of the fuel causes the piston 106 to move rapidly from the starting position of FIG. 1A to the end position of FIG. 1B. This motion results in the driver 108 affixed to the piston 106 to force the fastener 110 at the end of the string 112 causing it to break from the string 112 and be driven into the workpiece surface 122. In addition, as the piston 106 reaches the end position it passes one or more relief valves 124A, 124B (e.g. reed valves) in wall of the piston cylinder 104 and impacts a bumper 126 to absorb the remaining energy. The high pressure combustion gases are forced through the relief valves 124A, 124B which close automatically, leaving the chamber 116 with a pressure lower than the ambient air, i.e. a vacuum.

The vacuum left within the chamber 116 after the combustion pressure passes the relief valves 124A, 124B allows the ambient air pressure acting on the external side of the piston 106 to force the piston 106 to return to the start position as shown in FIG. 1A. During the piston 106 return to the start position the pressure within the combustion chamber 116 remains below ambient.

As previously described, embodiments of the invention employ a novel retention chamber 102. The retention chamber 102 comprises a separate space that becomes closed (i.e. sealed) automatically as the piston 106 is moved to the start position. Typically, at least a first interior wall 128A of the retention chamber 102 is affixed to the piston 106 and at least a second interior wall 128B is affixed to the combustion chamber 116. As shown in FIGS. 1A and 1B, the retention chamber 102 is formed when a recess 130A affixed to the piston and a recess affixed to the combustion chamber 116 are moved together as the piston 106 is moved to the starting position. As shown, the piston recess 130A and the combustion chamber recess 1301 each comprise open ended cylindrical portions with the outer diameter of the piston recess 130A fitting within the inner diameter of the chamber recess 130B. However, those skilled in the art will appreciate that other equivalent configurations are possible which meet the requirement of forming a sealed space as the piston 106 moves to the starting position. For example, alternately the piston recess 130A can made with a larger inner diameter to receive a smaller outer diameter of chamber recess 130B.

As the piston 106 moves back to the starting position under the vacuum left in the chamber 116 after the combustion gases are vented through the exhaust valves 124A, 124B, some of the vacuum is captured in the closed (sealed) retention chamber 102. It should also be noted that as the retention chamber closes some pressure may be vented from the retention chamber 102 to the surrounding combustion chamber 116 through a small relief valve 132 which only allows higher pressure to pass from the retention chamber 102 to the combustion chamber 116 and not the reverse. It should be noted that although there is a pressure differential between the two, the pressure in both the combustion chamber 116 and the retention chamber 102 is below ambient pressure (i.e. a "vacuum") during the piston return process.

After the piston 106 is returned to the starting position, trapping vacuum within the retention chamber 102, the combustion chamber 116 may be charged with fuel for the next firing. As previously mentioned, fuel charging is typically performed at ambient pressure. In any case, the pressure retention chamber 102 is lower than that of the combustion chamber 116 during the subsequent fueling and combustion cycle. This pressure differential between the retention chamber 102 and the surrounding combustion chamber 116 yields the retention force which secures the piston 106 in the starting position and momentarily resists motion of the piston 106 during as combustion initiates as previously described. The parameters for a particular application, chamber size (including cross section and stroke distance), seals, relief valve, etc., can be readily determined by one skilled in the art. Notably, the axial cross-sectional area of the retention chamber multiplied by the estimated differential pressure between the retention chamber pressure and ambient pressure will approximate the retention force.

Other elements necessary for the operation of a combustion driven fastener hand tool are not shown in the figures, such as static and dynamic seals, the fuel charging and ignition systems, as well as the safety and triggering mechanisms. However, those skilled in the art will appreciate that the retention chamber 102 can be readily implemented with any known combustion driven fastener hand tool which exhibits temporary vacuum within the combustion chamber after firing. Moreover, embodiments of the invention can be implemented with combustion driven fastener hand tool that use different fuels, combustion chamber designs as well as any other known improvements or variations in the mechanism and systems.

Figure 1C:
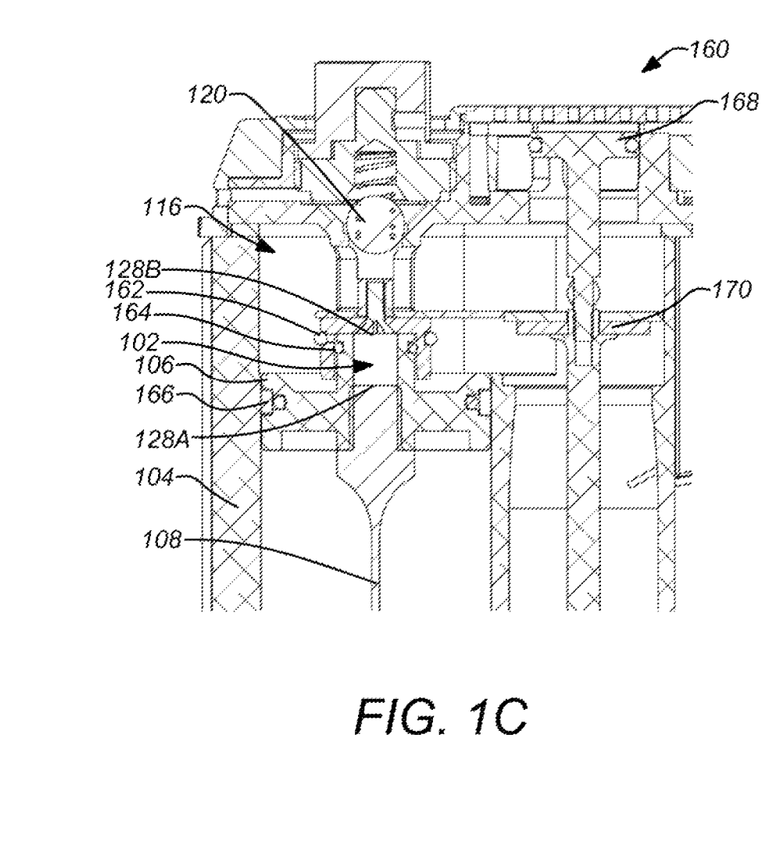
FIGS. 1C and 1D illustrate an example embodiment of a combustion driven fastener hand tool modified to employ a vacuum piston retention chamber in the piston start position and just following release during combustion, respectively.
Figure 1D:
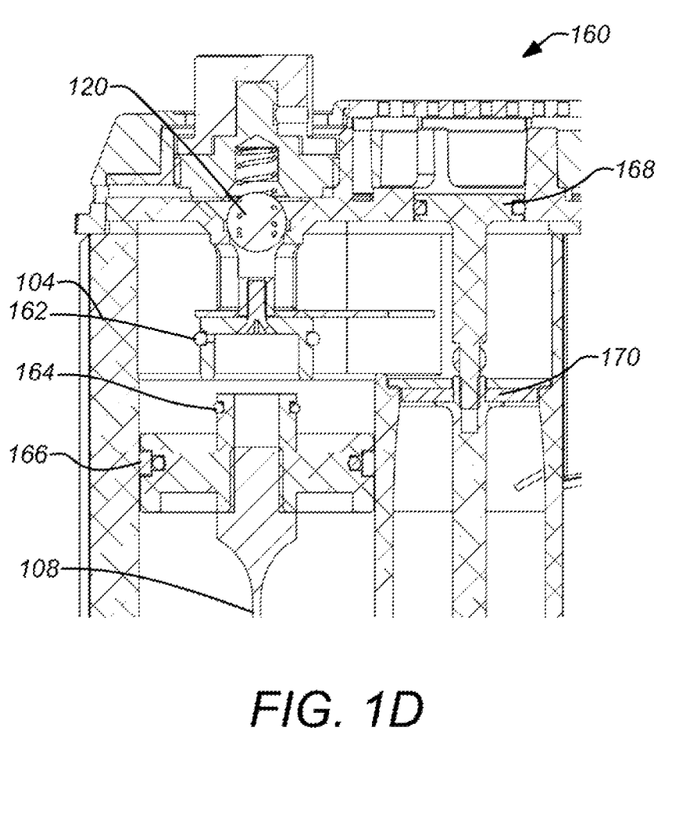

FIGS. 1C and 1D illustrate an example embodiment of a combustion driven fastener hand tool 160 modified to employ a vacuum piston retention chamber 102 in the piston start position and just following release during combustion, respectively. Except as specified, this example tool 160 operates consistent with the functional description outlined above for the tool 100 of FIGS. 1A and 1B. In this particular example the pressure limit valve 120 comprises an adjustable spring loaded ball check valve. The valve 120 adjustment is made with a dial turned by the user to adjust the spring compression force against the seated ball. The piston 106 is shown using dynamic seals 166 for trapping the combustion gases in the chamber 116.

As shown in FIG. 1C, the retention chamber 102 is formed by merging a recess in the piston with a recess in the chamber. The piston recess comprises cylindrical sidewalls from a central bore through the piston and a back wall formed by the back end of the driver 108 threaded into the bore. The recess in the chamber comprises a cylindrical cup having a back wall formed by a mounting screw affixed to a stop extending from the top end of the chamber (piston cylinder 104). A dynamic seal 164 comprising an o-ring disposed in a groove in the outer cylindrical sidewall of the piston recess seals the retention chamber 102 as the piston recess and the chamber recess come together. Alternately, the seal 164 can be disposed within a groove in the inner cylindrical wall of the chamber recess.

The retention chamber 102 also includes a relief valve 162 comprising one or more radial ports from the combustion chamber 116 to the retention chamber 102 interior (behind seal 164) which are blocked by an o-ring seal. The o-ring of the relief valve 162 is disposed in a groove in the outer cylindrical wall of the recess chamber cup. As previously described, when the piston is returning to the start position and the retention chamber closes a higher pressure may exist within the retention chamber. The relief valve 162 allows this higher pressure to escape to the combustion chamber 116; the o-ring over the ports only allows gas pressure to move from the retention chamber to the combustion chamber but not the reverse.

In this example embodiment the tool 160 is implemented using a divided combustion chamber similar to that described in the U.S Patent Application Publication No. 2012/0210974, published Aug. 23, 2012, by Adams, which is incorporated by reference herein. Accordingly, a control plate 170 is opened along with external valve 168 to ambient air when the combustion chamber is fueled as shown in FIG. 1C. Fuel enters through a valved port (not shown) below the control plate 170. Prior to firing (and maintained during and piston reset), the external valve 168 is sealed and the control plate position to divide the combustion chamber as shown in FIG. 1D. However, those skilled in the art will understand that employing a vacuum retention chamber 102 does not require this type of combustion chamber; a retention chamber 102 can be implemented with any conventional combustion chamber of a combustion driven fastener device.

It should be noted that embodiments of the invention are not limited to the specific physical configuration shown herein using two open cylinders which merge one within the other. Many alternate structures are also possible.

Figure 1E:
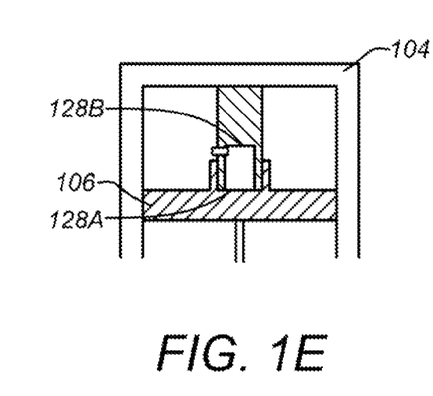
FIGS. 1E-1I are schematic cross sectional drawings of alternate combustion chamber designs for a combustion driven fastener hand tool using a vacuum piston retention chamber.
Figure 1F:
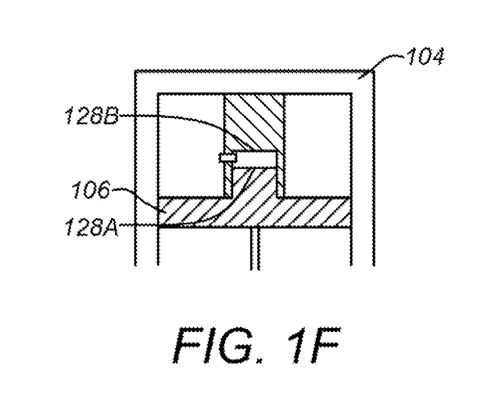
Figure 1G:
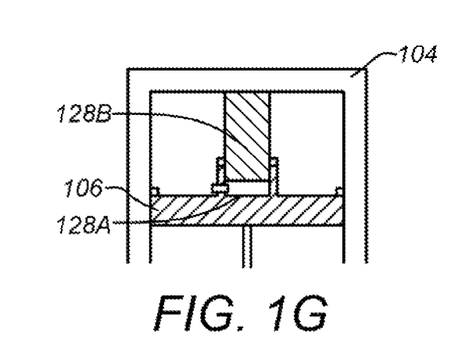

FIGS. 1E-1I are schematic cross sectional drawings of alternate combustion chamber designs for a combustion driven fastener hand tool using a vacuum piston retention chamber. FIG. 1E illustrates a configuration where the open cylinder of chamber side fits into the open cylinder of the piston as previously mentioned. FIGS. 1F and 1G illustrate a single open cylinder (on the chamber side in FIG. 1F and the piston side in FIG. 1G) can be employed to seal within a smaller "piston" (or closed cylinder) that is driven into the open cylinder. Seals (not shown) can be disposed in either the cylinder wall as shown in other embodiments herein and understood by those skilled in the art. In order to control the retention chamber volume, the piston depth can be controlled with a stop (e.g. against the piston as shown in FIG. 1F or the cylinder wall as shown in FIG. 1G).

Figure 1H:
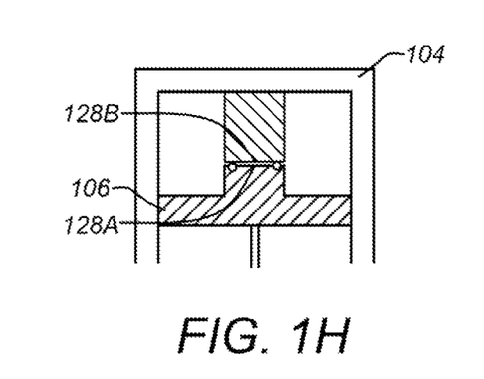
Figure 1I:
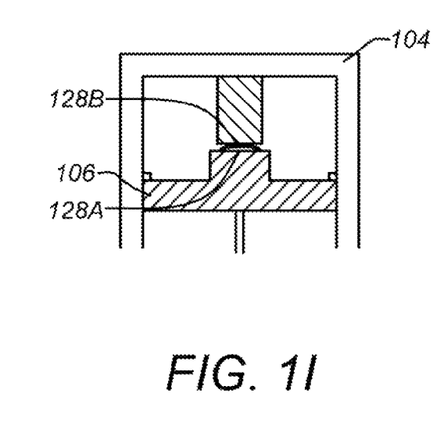
Figures 2A, 2B:
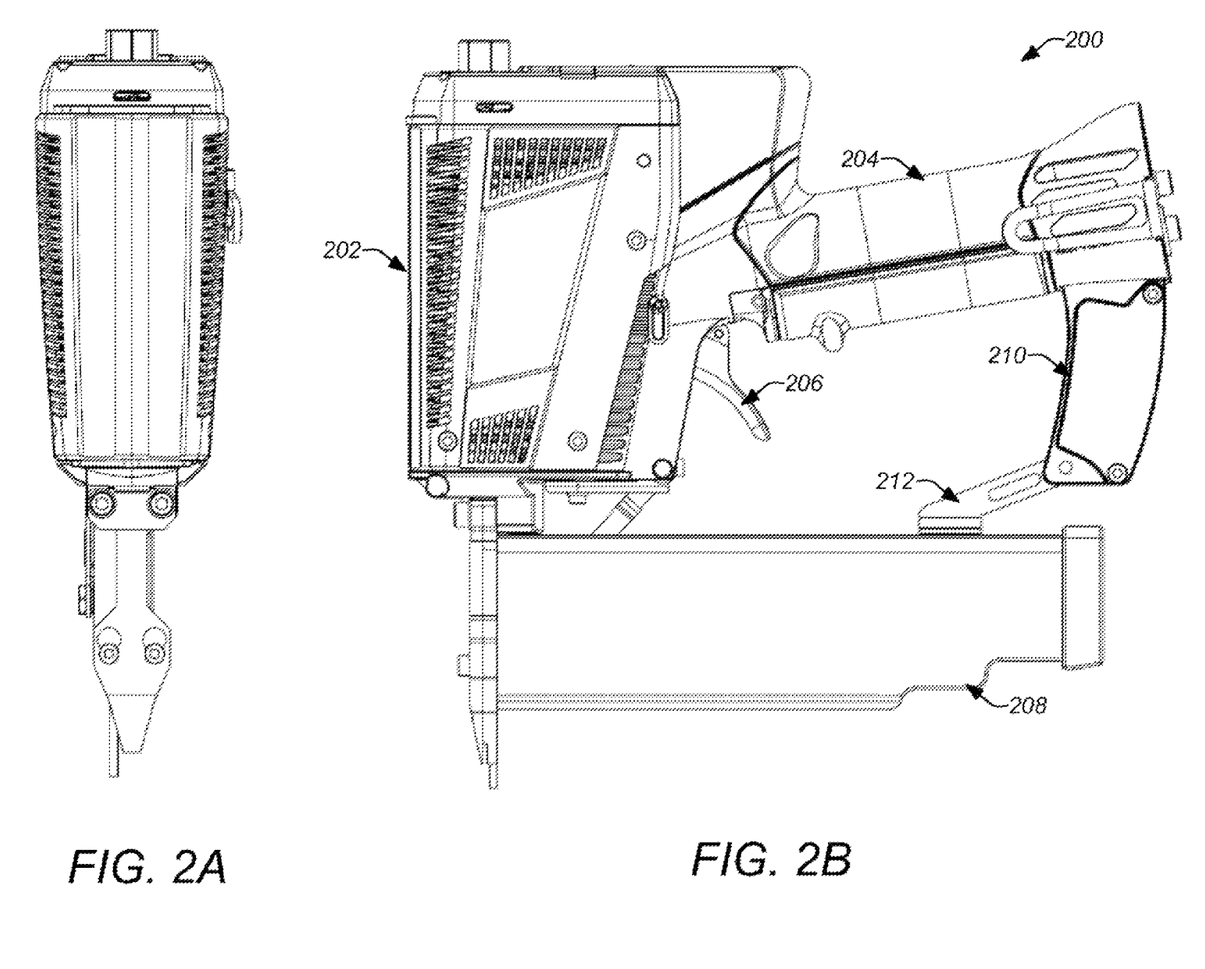
FIGS. 2A-2E illustrate front, side, bottom, top, and isometric views, respectively, of an exemplary combustion driven fastener hand tool embodiment of the invention.
Figure 2C:
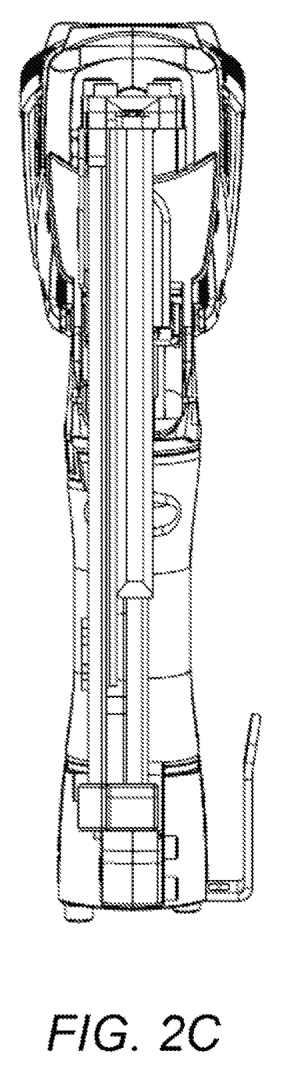
Figure 2D:
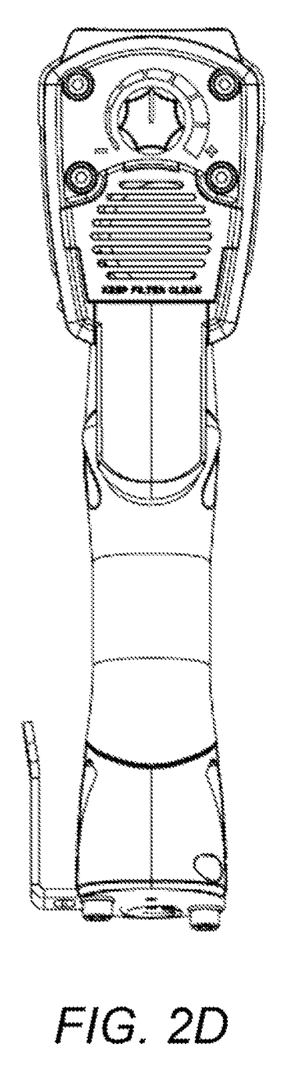
Figure 2E:
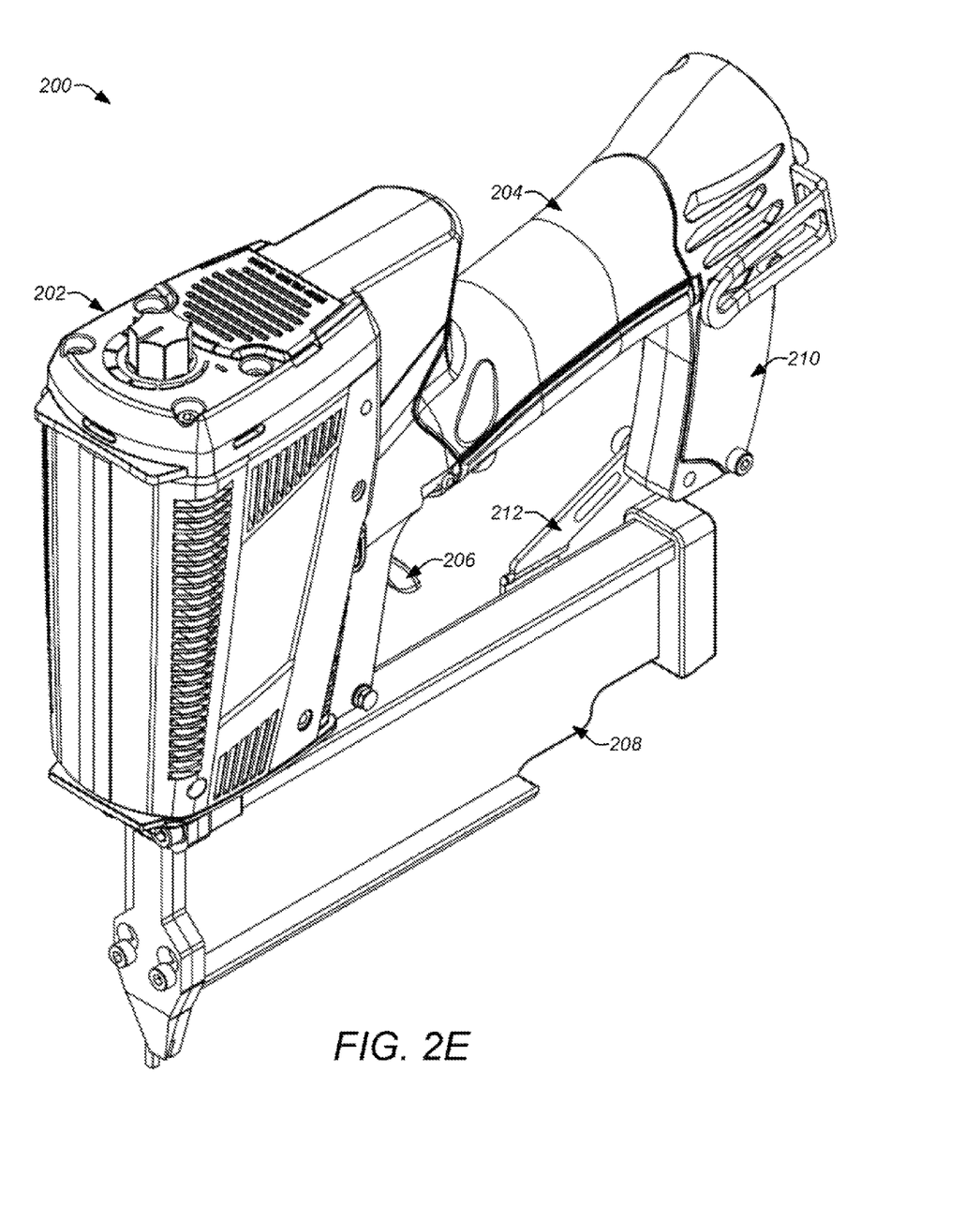

FIGS. 1H and 1I illustrate configurations operable without any open cylinder and such that a seal for the retention chamber functions as the relief valve. FIG. 1H shows two smooth surface with only a face seal (captured in groove of one surface) therebetween. The face seal can be an o-ring or a specially designed shape captured in a lip or groove as understood by those skilled in the art. The seal can be disposed in either surface. Optionally, one or both surfaces could have a recess or concavity. This configuration does not require a separate relief valve as the face seal functions as a relief valve as any pressure differential is expelled through the seal as it closes. FIG. 1I illustrates a retention chamber can constructed configured as a "suction cup," having a flexible cup recess affixed to the chamber side and a flat surface on the other. Similar to the configuration of FIG. 1H, the suction cup configuration does not require a relief valve because the suction cup seal functions automatically as a relief valve as it is pressed into contact with the surface. Alternately, the suction cup can be disposed on the piston side. Piston stops can be optionally employed with either of the configurations of FIG. 1H or 1I. The seal or suction cup can be manufactured from any suitable elastomeric material capable of surving combustion gases and temperature as will be understood by those skilled in the art.

Some of the important parameters in designing a particular application include sizing the axial cross sectional area of the retention chamber based on the estimated differential pressure between the retention chamber pressure and ambient pressure, the desired retention force and estimated combustion pressure. In addition, it is desirable to minimize the distance the piston must move from the closed position before releasing the retention chamber vacuum; a negligible release stroke minimizes the energy loss. Similarly, the volume of the retention chamber should be minimized as some energy loss may occur as the combustion gases must occupy the retention chamber space after it opens. In the example tool 160 of FIGS. 1C and 1D, the retention chamber volume can be readily adjusted by extending the threaded end of the piston driver 108 or simply forming a blind hole for the piston driver (to reduce piston mass).

4. Exemplary Combustion Driven Fastener Hand Tool

Those skilled in the art will appreciate that a retention chamber can be implemented in almost any type of combustion driven fastener hand tool. A suitable example combustion driven hand tool for use with retention chamber is described in this section.

FIGS. 2A-2E illustrate front, side, bottom, top, and isometric views, respectively, of an exemplary combustion driven fastener hand tool embodiment of the invention. The exemplary combustion driven fastener hand tool 200 includes a front body 202 which houses the piston and combustion chambers. A grip portion 204 and a trigger 206 extend from the front body 202. The grip portion 204 is held by the user during operation. The grip portion 204 also encloses a fuel cartridge and includes a pressure regulator and fuel mixing components of the fuel system. A fastener strip carrier 208 is disposed laterally from one end of the front body 202. Typically, a fastener strip comprises a series of separate slender metal fasteners disposed side by side and lightly bonded together, e.g. by a tape layer, as is known in the art. A battery carrier section 210 extends from the end of the grip portion 204 towards the end of the fastener strip carrier 208. Additional structural support is afforded by a bracket 212 coupled between the battery carry section 210 and the fastener strip carrier 208.

Figure 3A:
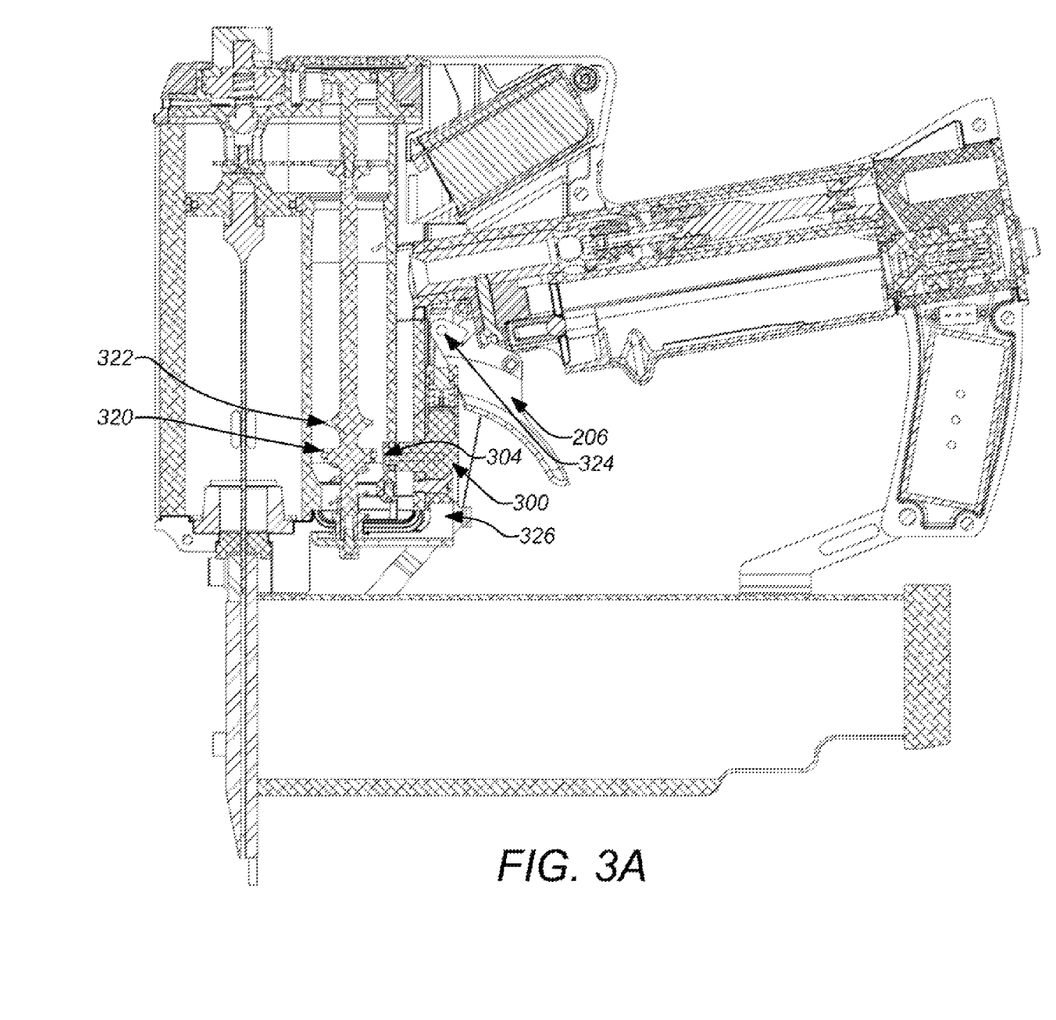
FIGS. 3A and 3B illustrate cutaway views of a fuel charging operation of an exemplary combustion driven fastener hand tool embodiment of the invention.
Figure 3B:
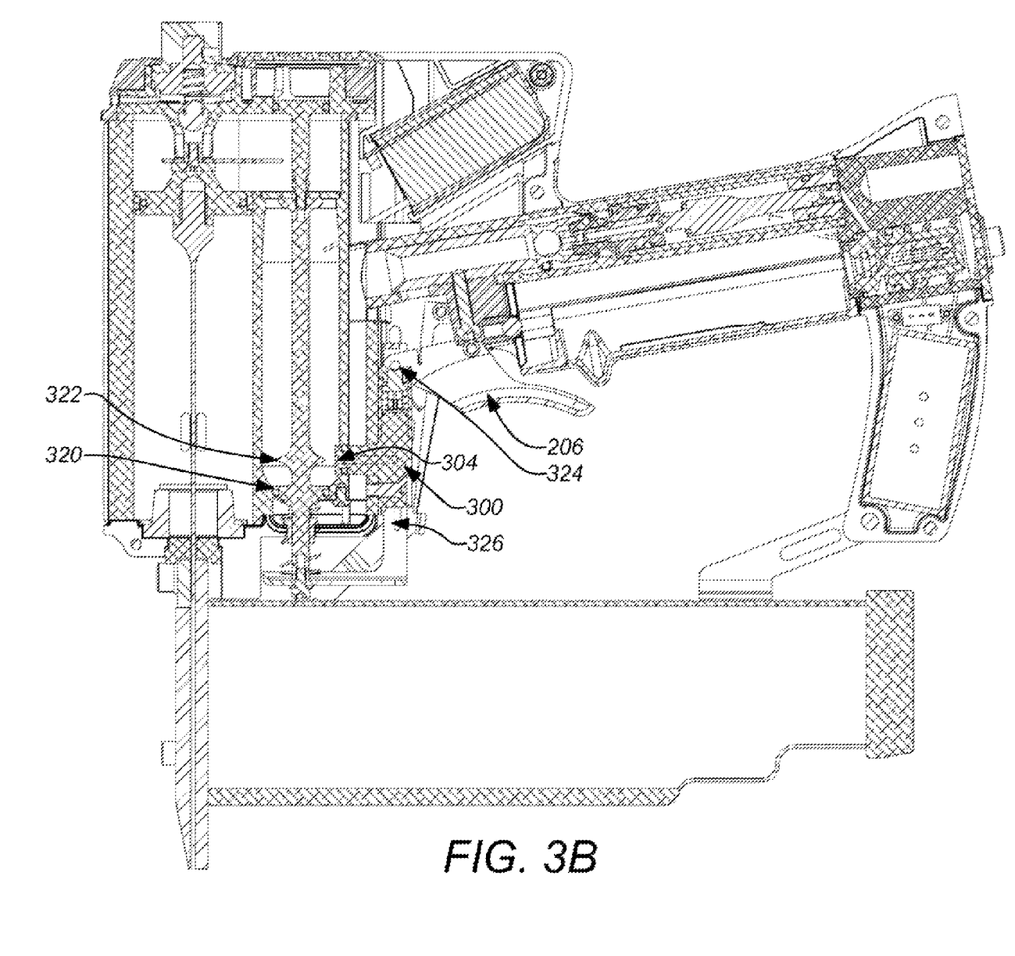

FIGS. 3A and 3B illustrate cutaway views of a fuel charging operation of an exemplary combustion driven fastener hand tool suitable for use with an embodiment of the invention. FIG. 3A shows the fuel port valve 320 in the open position with the valve stem disc 322 for spark generation. Note the valve stem disc is disposed above the spark point 704 of the igniter component 300. FIG. 3B shows the fuel port valve 320 in the closed position with the valve stem disc 322 for spark generation. The chamber valve 320 is closed by the user pulling the trigger 206 toward the hand grip. The trigger 206 has a pinned joint 324 at a front end coupled to a sliding link 326 which is coupled to the fuel port valve 320. Here the valve stem disc is disposed in line with the spark point 304 of the igniter component 300 providing the closest separation for spark generation. Note that the FIGS. 3A and 3B do not show a retention chamber as described in the previous section. However, FIGS. 1C and 1D illustrate modifications to this design to incorporate a retention chamber, illustrating how an existing combustion driven fastener hand tool design can be readily adapted to employ a retention chamber.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A combustion driven fastener apparatus, comprising:
  a piston disposed in a combustion chamber, the piston movable from a starting position to an end position within the combustion chamber;
  a driver affixed to the piston for driving a fastener as the piston moves from the starting position to the end position; and
  a retention chamber closed and sealed separate from and within the combustion chamber with the piston in the starting position and opened and unsealed from the combustion chamber after the piston is moved from the starting position, the retention chamber having at least a first interior wall affixed to the piston and at least a second interior wall affixed to the combustion chamber.

2. The apparatus of claim 1, wherein the retention chamber seals a pressure differential between the retention chamber and the combustion chamber after the retention chamber is closed in response to a previous firing of the combustion driven fastener apparatus.

3. The apparatus of claim 2, wherein the pressure differential momentarily resists motion of the piston under combustion from firing the combustion driven fastener apparatus.

4. The apparatus of claim 2, wherein the pressure differential is a lower pressure in the retention chamber than the combustion chamber.

5. The apparatus of claim 2, wherein a dynamic seal seals the retention chamber by moving into an interface between a first portion of the retention chamber affixed to the piston and a second portion of the retention chamber affixed to the combustion chamber.

6. The apparatus of claim 1, wherein the retention chamber comprises a relief valve for gas to escape the retention chamber as the retention chamber is closed as the piston returns to the starting position.

7. The apparatus of claim 1, wherein the retention chamber comprises a first cylindrical portion affixed to the piston and a second cylindrical portion affixed to the combustion chamber.

8. The apparatus of claim 7, wherein one of the first cylindrical portion and the second cylindrical portion fits inside the other to form the retention chamber.

9. The apparatus of claim 7, wherein a seal is disposed in a groove of one of the first cylindrical portion and the second cylindrical portion to seal a lower pressure within the retention chamber than the combustion chamber.

10. The apparatus of claim 7, wherein at least one of the first cylindrical portion and the second cylindrical portion comprises an open cylinder.

11. The apparatus of claim 10, wherein one of the first cylindrical portion and the second cylindrical portion comprises the open cylinder and a remaining one of the first cylindrical portion and the second cylindrical portion comprises a closed cylinder.

12. The apparatus of claim 10, wherein one of the first cylindrical portion and the second cylindrical portion comprises the open cylinder and a remaining one of the first cylindrical portion and the second cylindrical portion comprises a smaller open cylinder that fits inside the open cylinder to form the retention chamber.

13. The apparatus of claim 1, further comprising a seal for the retention chamber for allowing gas to escape the retention chamber as the retention chamber is closed as the piston returns to the starting position.

14. The apparatus of claim 13, wherein one of the first interior wall and the second interior wall comprises a suction cup and a remaining one of the first interior wall and the second interior wall comprises a flat surface;
  wherein the seal for the retention chamber comprises the suction cup.

15. The apparatus of claim 13, wherein one of the first interior wall and the second interior wall comprises a face seal disposed in a surface and a remaining one of the first interior wall and the second interior wall comprises a flat surface;
  wherein the seal for the retention chamber comprises the face seal.

16. A combustion driven fastener apparatus, comprising:
  a piston means for moving from a starting position to an end position within the combustion chamber disposed in a combustion chamber;
  a driver means for driving a fastener as the piston moves from the starting position to the end position, the driver means affixed to the piston means; and
  a retention chamber means for sealing a pressure differential between the retention chamber and the combustion chamber after the retention chamber is closed in response to a previous firing of the combustion driven fastener apparatus;
  wherein the retention chamber means closed and sealed separate from and within the combustion chamber with the piston in the starting position and opened and unsealed from the combustion chamber after the piston is moved from the starting position.

17. The apparatus of claim 16, further comprising a relief valve means for allowing gas to escape the retention chamber means as the retention chamber means is closed as the piston means returns to the starting position.

18. The apparatus of claim 16, wherein the pressure differential momentarily resists motion of the piston means under combustion from firing the combustion driven fastener apparatus.

19. The apparatus of claim 16, wherein the pressure differential is a lower pressure in the retention chamber means than the combustion chamber.

20. The apparatus of claim 16, further comprising a seal for the retention chamber means for allowing gas to escape the retention chamber means as the retention chamber means is closed as the piston means returns to the starting position.

* * * * *